US011630921B2

United States Patent
Sinha et al.

(10) Patent No.: US 11,630,921 B2
(45) Date of Patent: Apr. 18, 2023

(54) BATCH CRYPTOGRAPHY FOR HARDWARE SECURITY MODULES

(71) Applicant: Google LLC, Mountain View, CA (US)

(72) Inventors: Aditya Sinha, New York, NY (US); Vanessa Reimer, New York, NY (US)

(73) Assignee: Google LLC, Mountain View, CA (US)

( * ) Notice: Subject to any disclaimer, the term of this patent is extended or adjusted under 35 U.S.C. 154(b) by 152 days.

(21) Appl. No.: 17/119,342

(22) Filed: Dec. 11, 2020

(65) Prior Publication Data

US 2021/0286901 A1 Sep. 16, 2021

Related U.S. Application Data

(60) Provisional application No. 62/987,595, filed on Mar. 10, 2020.

(51) Int. Cl.
*G06F 21/72* (2013.01)
*G06F 9/54* (2006.01)
*G06F 13/40* (2006.01)
*G06F 21/60* (2013.01)

(52) U.S. Cl.
CPC .............. *G06F 21/72* (2013.01); *G06F 9/547* (2013.01); *G06F 13/4063* (2013.01); *G06F 21/602* (2013.01)

(58) Field of Classification Search
CPC ........ G06F 21/72; G06F 21/602; G06F 9/547; G06F 13/4063
See application file for complete search history.

(56) References Cited

U.S. PATENT DOCUMENTS

| | | | |
|---|---|---|---|
| 2007/0180228 A1* | 8/2007 | Mattsson | H04L 9/088 713/156 |
| 2018/0012037 A1* | 1/2018 | Warnez | G06F 21/604 |
| 2020/0175179 A1* | 6/2020 | Iyer | G06F 21/602 |

FOREIGN PATENT DOCUMENTS

| | | |
|---|---|---|
| WO | 2006089278 A2 | 8/2006 |
| WO | 2012149395 A1 | 11/2012 |

OTHER PUBLICATIONS

International Search Report and Written Opinion for International Application No. PCT/US2021/017001 dated May 31, 2021. 12 pages.

* cited by examiner

*Primary Examiner* — Philip J Chea
*Assistant Examiner* — Sangseok Park
(74) *Attorney, Agent, or Firm* — Lerner, David, Littenberg, Krumholz & Mentlik, LLP

(57) ABSTRACT

Methods, systems, and apparatuses, including computer storage media and hardware security modules, for performing batch cryptography on hardware security modules. A hardware security module can receive a request to perform one or more cryptographic operations. The request can include a batch data structure storing a plurality of data elements. The hardware security module can unbatch the plurality of data elements, perform one or more cryptographic operations on the plurality of data elements to generate a plurality of outputs, generate an output batch data structure storing the plurality of outputs, and transmit the output batch data structure in response to the request. The request and the batch data structure can be formed in accordance with a batch hardware security module application program interface (API) implemented by the hardware security module.

9 Claims, 9 Drawing Sheets

BATCH CRYPTOGRAPHY FOR HARDWARE SECURITY MODULES

CROSS-REFERENCE TO RELATED APPLICATIONS

This application claims the benefit of the filing date of U.S. Provisional Patent Application No. 62/987,595 filed on Mar. 10, 2020, the disclosure of which is hereby incorporated herein by reference.

BACKGROUND

Hardware security modules (HSMs) are devices that can store cryptographic keys and can perform cryptographic operations on plaintext or ciphertext data using those keys. For example, certification authorities and registration authorities in a public key infrastructure environment may use HSMs to provide a level of public assurance that cryptographic keys correspond to their correct owners. As another example, HSMs can also be used by card payment systems as part of securely transmitting user credit card information across devices of a network.

HSMs can be designed and constructed with one or more physical security measures to provide protection or resistance from tampering. For example, an HSM can be configured to render itself inoperable or its stored keys inaccessible upon detecting an actual or attempted physical breach into the housing of the HSM. One or more HSMs can be implemented as part of a layer of physical security to a larger security network, which itself may include a variety of hardware and software components.

HSMs can be expensive, often due to the implementation of one or more physical security measures and the inclusion of one or more specialized cryptoprocessors, as well as due to the process to certify the HSM for cryptographic use. Cryptoprocessors are processing units specially configured for performing some cryptographic operations, such as encryption, decryption, or initializing random or pseudorandom values as part of implementing a cryptographic scheme using the HSM. A cryptoprocessor can be implemented as a co-processor alongside one or more general processing units, such as one or more central processing units (CPUs). The HSM may have multiple cryptoprocessors that are partitioned and configured to perform hardware acceleration. Input to the HSM can be distributed for processing among each cryptoprocessor. For example, an HSM often has a single interface to allow access to its multiple cryptoprocessors. However, the interface may not allow for the HSM to be used at its fullest processing capability, such as when receiving requests to encrypt small plaintexts.

The present disclosure provides for adding a new set of application programming interfaces (APIs) to an HSM that process a batch of similar requests in a single message to the HSM. The new set of APIs can include an encrypt API. The encrypt API can accept: (1) An identifier for a key; and (2) An array of plaintexts and return an array of ciphertexts. The new set of APIs can include a decrypt API. The decrypt API can accept: (1) An identifier for a key; and (2) An array of ciphertexts, and return an array of plaintexts. In some implementations, the new set of APIs can include other APIs for performing other cryptographic operations, such as Sign, Verify, MAC, as described herein. The different defined APIs can also define cryptographic operations according to particular cryptographic schemes, such as APIs to an HSM defining Advanced Encryption Standard (AES) encryption and decryption, which can further define different modes of operation, such as Galois/Counter Mode (GCM).

An HSM vendor would implement the functionality in their device such that the main processor acts on the entire batch simultaneously. For example, the processor may validate all of the plaintexts, pass all the validated plaintexts to the co-processor, and then return all back to the user. The main processor in the HSM would forward the batch to the crypto processor which would unpack the array, handle each operation separately, and pack the result into another batch. The main processor would copy the batch back to the HSM user.

This has the advantage of significantly reducing the per-operation overhead for small plaintext cryptographic operations, where a constant cost of each operation dominates. For example, throughput for small (32 byte) plaintexts may be increased from an order of thousands of requests-per-second (RPS) to an order of millions of RPS.

One aspect of the disclosure provides for a hardware security module (HSM) including plurality of processors configured to: receive a request to perform one or more cryptographic operations, wherein the request comprises a first batch data structure storing a plurality of data elements. The plurality of processors are further configured to process the first batch data structure in accordance with the received request and the one or more cryptographic operations. To process the first batch data structure the plurality of processors are configured to: unbatch the plurality of data elements, perform the one or more cryptographic operations on the plurality of data elements to generate a plurality of outputs, and generate an output batch data structure storing the plurality of outputs.

The request can be a first request, the one or more cryptographic operations can be one or more first cryptographic operations, and the plurality of data elements can be a plurality of first data elements. The plurality of processors can be further configured to: maintain, in memory coupled to the HSM, one or more cryptographic keys, receive a second request to perform one or more second cryptographic operations on a second batch data structure, wherein the second batch data structure comprises a key identifier and a plurality of second data elements. The plurality of processors can be further configured to determine whether the key identifier corresponds to a cryptographic key of the one or more cryptographic keys, and in response to a determination that the key identifier corresponds to an identified cryptographic key, process the second batch data structure in accordance with the second request and using the identified cryptographic key as input to the one or more second cryptographic operations.

The hardware security module can include a first processor and a second processor, wherein the first processor is configured to: receive, as input, the batch data structure, perform one or more pre-processing operations on the batch data structure, determine whether the batch data structure is valid for processing, and in response to a determination that the batch data structure is valid for processing, send the validated batch data structure to the second processor.

The first processor can be a general-purpose processor and the second processor can be a cryptoprocessor configured to perform the one or more cryptographic operations on the pre-processed batch data structure. The request and the batch data structure can be formed in accordance with a respective definition by a batch HSM application program interface (API).

The one or more cryptographic operations the HSM is configured to perform can be defined in accordance with the batch HSM API.

The batch HSM API can define one or more APIs, each API defining a respective cryptographic scheme, including defining one or more respective data structures and one or more respective cryptographic operations for performing the respective cryptographic scheme.

The cryptographic operations can include operations for encryption, decryption, key generation, signature generation, signature verification, random number generation, or message authentication.

The request can be a first request, the HSM can be coupled to a computing device, and the plurality of processors can be further configured to receive and process a second request including a second batch data structure including data elements batched by the computing device.

Other implementations of the foregoing aspect can include a computer-implemented method, an apparatus, and computer programs recorded on one or more computer-readable storage media.

DETAILED DESCRIPTION

Figure 1:
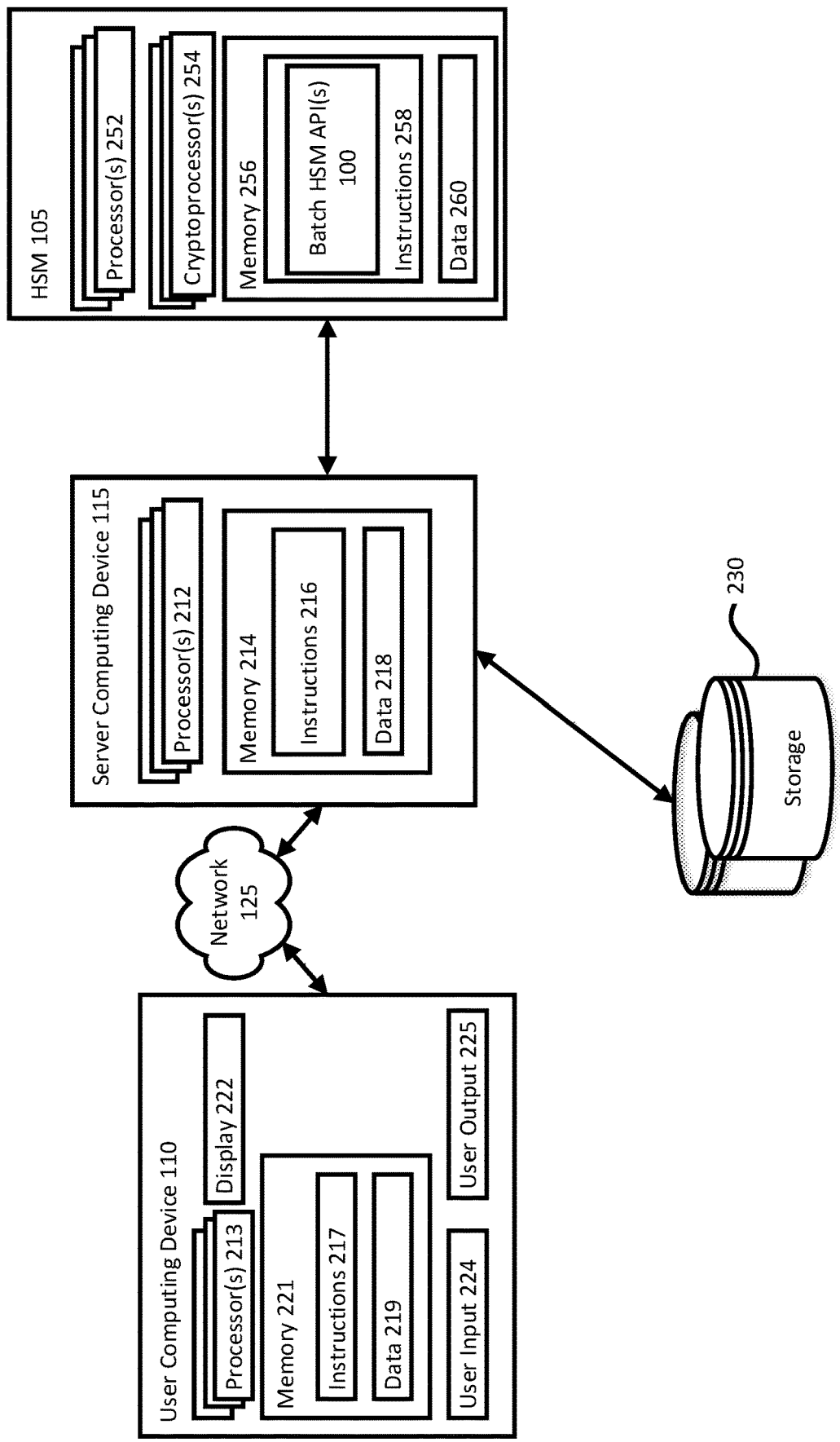
FIG. 1 is a block diagram of a user computing device in communication with a server computing device coupled to an HSM implementing one or more batch HSM APIs.

The present disclosure provides for methods, systems, and apparatuses, including computer-readable storage media and devices, for performing batch cryptography on a hardware security module (HSM). An HSM can be configured to receive batches of requests to perform cryptographic operations on the HSM. Rather than receive individual requests to perform an operation on a payload, the HSM can be configured to receive a batch of data for performing the same operations in a batch. For example, instead of the HSM receiving individual requests to encrypt a plaintext with a cryptographic key, the HSM can be configured to receive a batch of plaintexts in a single request to encrypt each request in the batch with the cryptographic key.

For example, the HSM may implement multiple processors for performing different operations related to performing batch cryptographic operations on the HSM. A first processor can receive a batch request that includes a batch data structure of data elements to be processed. A batch data structure can be an array or a vector of individual data elements, such as plaintexts or ciphertexts for encryption and decryption, respectively. The first processor can perform pre-processing operations such as input validation on the batch data structure, and upon validation send the batch data structure to a second processor. The second processor can be a cryptoprocessor specially configured to perform cryptographic operations specified in the batch request. As an example, the second processor can unpack the batch data structure, perform each operation on each individual data element from the batch data structure, and pack the results of performing the operations into another batch data structure.

The first processor can be configured to send the output batch data structure to a requesting computing device that sent the batch request to the HSM. From the perspective of a requesting computing device, the batch processing can be performed in an opaque manner, because batched data can be sent to the HSM, and batched output data can be received from the HSM in response to the input, without a requesting computing device having to specify to the HSM how the batched data is to be processed.

The batch data structure can be divided by the HSM into multiple sub-batches, and distributed across multiple cryptoprocessors implemented by the HSM. Cryptoprocessors can include multiple processing cores, and in some implementations the HSM can divide a received batch of data across each core of a cryptoprocessor for processing.

The HSM and requesting device can perform operations according to one or more batch HSM application program interfaces (APIs). According to aspects of this disclosure, a batch HSM API can define one or more batch functions composed from operations that an HSM is configured to perform. The batch HSM API(s) can define batch functions and batch data structures for any of a variety of different cryptographic primitives. For example, the batch HSM API(s) can define batch functions for batch encryption, batch decryption, and batch key generation, as composites of individual operations performable by the HSM for encryption, decryption, and key generation, respectively.

Computing devices coupled to the HSM can implement batching logic to batch requests and send the batched requests to the HSM for batch processing. In this way, an HSM can require minimal modification, for example, by an HSM vendor, for implementing batch cryptography in accordance with aspects of this disclosure. Further, processing throughput on an HSM can be increased and per-operation overhead can be reduced, particularly in use cases in which requesting computing devices send many requests to process small data elements, such as to encrypt small plaintexts. For example, operations performed by the HSM to perform pre-processing operations and to communicate data between processors or processing cores of a HSM can be reduced, at least because data elements for processing are sent together in batches as opposed to being sent individually.

FIG. 1 is a block diagram of a user computing device 110 in communication with a server computing device 115 coupled to an HSM 105 implementing batch logic for one or more batch HSM APIs 100. The user computing device 110 can be configured to communicate over a network 125 with the server computing device 115. The user computing device 110 can be any of a variety of different types of devices capable of processing instructions and transmitting data to and from humans and other computers, such as a laptop, a desktop computer, a mobile device like a phone or a tablet, a video game console, a set-top box for a TV, a network computer lacking local storage capability, or a device intended to be worn, such as a watch, earbuds, etc.

The server computing device 115 can be a single device, or can be part of a datacenter, which itself may be part of a cloud computing platform. The cloud computing platform can include a plurality of datacenters including multiple server computing devices, such as the server computing device 115. In some implementations, the user computing device 110 is coupled to the HSM 105, for example because the HSM 105 is installed as a physical component on the user computing device 110. The user computing device 110 and the HSM 105 can also be coupled through a physical connection, such as a bus or a wire.

The devices 110, 115 can be capable of direct and indirect communication over the network 125. For example, using an Internet socket, the user computing device 110 can connect to a service operating on the server computing device 115 through an Internet protocol. The server computing device 115 can set up listening sockets that may accept an initiating connection for sending and receiving information. The network 125 itself can include various configurations and protocols including the Internet, World Wide Web, intranets, virtual private networks, wide area networks, local networks, and private networks using communication protocols proprietary to one or more companies. The network 125 can support a variety of short- and long-range connections along a variety of different bandwidths, such as 2.402 GHz to 2.480 GHz, commonly associated with the Bluetooth® standard, 2.4 GHz and 5 GHz, commonly associated with the Wi-Fi® communication protocol, or with a variety of communication standards, such as the LTE® standard for wireless broadband communication. The network 125, in addition or alternatively, can also support wired connections between the devices 110, 115 including various types of Ethernet connection.

The HSM 105 can be a computing device implementing one or more physical security measures for performing cryptographic operations and storing one or more cryptographic keys. The HSM 105 can be a separate computing device coupled to the server computing device 115, for example through the network 125 or through a separate connection. The connection can be wired or wireless. For example, the HSM 105 can be coupled to the server computing device 115 through one or more physical cables, or through a bus interfacing between the HSM and the server computing device 115. In some implementations, the HSM 105 is a card or other physical module that can be slotted directly into the server computing device 115.

The HSM 105 can be built with a tamper-proof or tamper-resistant housing. As an example, the HSM 105 can be configured to detect a breach or attempted breach of the housing of the HSM 105, and in response can render itself inoperable or its stored cryptographic keys unusable. The HSM 105 can implement any of a variety of different physical security measures.

The HSM 105 can include one or more cryptoprocessors 254. A cryptoprocessor can be a processing unit configured for performing cryptographic operations. On some devices, a cryptoprocessor can be implemented as a co-processor to another type of processing unit, such as another cryptoprocessor or a general-purpose CPU. One or more of the cryptoprocessors 254 can be configured for hardware acceleration in performing at least some types of cryptographic operations. For example, a cryptoprocessor can be a cryptographic accelerator and be configured for efficiently performing cryptographic operations, including operations associated with different types of cryptographic schemes such as the Advanced Encryption Standard (AES).

The HSM 105 can be part of a large network of many computing devices generating requests to perform cryptographic operations on the HSM 105. The network 125 may have a small number of computing devices, for example a small enterprise network serviced by the HSM 105. Other networks can have a large number of computing devices, for example thousands of devices of a computing platform. Each computing device can generate a plurality of requests for performing cryptographic operations on some data, such as a plaintext or a ciphertext.

The number of cryptographic keys managed by the HSM 105 can vary. The HSM 105 can implement a key hierarchy, in which one or more root cryptographic keys stored on the HSM 105 are used to encrypt and/or decrypt cryptographic keys stored on a device elsewhere from the HSM 105. The HSM 105 can be selected as part of a security system on the network 125 for storing one or more root cryptographic keys as an added measure of security, at least because the HSM 105 can implement one or more physical security measures that are not implemented on other devices of the network 125 that engage in cryptographically secure communication.

As an example of communication throughput, computing devices across the network 125 may send on the order of 1,000 RPS (requests per second) to the HSM 105. Depending on traffic patterns and other conditions, the HSM 105 may receive bursts of traffic orders of magnitude higher than the average stream of traffic. For example, the network 125 may transmit 1,000 RPS to the HSM 105 with occasional bursts of up to 150,000 RPS.

As one example, devices 110, 115 of the network 125 in communication with the HSM 105 can include automated teller machines or credit card kiosks, configured to securely communicate sensitive data. As another example, devices of the network 125 can include devices that are in communication with the HSM 105 for verifying the credentials of a certified entity, for example at a certification authority.

Each individual request can include a data element that is the data to be processed by the HSM 105. The size of each individual data element sent as part of a request for processing to the HSM 105 can vary greatly. For example, the HSM 105 may receive requests to encrypt plaintexts as small as 32 bytes or smaller, or as large as 128 kilobytes or larger.

Cryptographic operations which can be performed by the HSM 105 can include encryption, decryption, key generation, random or pseudorandom number generation, signing, signature verification, message authentication, and others. In this specification, encryption (Enc(•)) and decryption (Dec(•)) generally refer to any of a variety of different techniques for encrypting a plaintext message m to a ciphertext c and decrypting the ciphertext c to a plaintext m. As an example, the plaintext m can be a string, for example as a string of raw bytes or a string of symbols or alphanumeric characters. The plaintext m can also be a data structure with elements representing plaintext, such as an array of strings. Encryption and decryption can refer to private key or public key cryptography.

A cryptographic scheme or function can refer to one or more cryptographic operations performed in a defined sequence, such as one or more encryption operations and one or more decryption operations. Different operations of a scheme can occur at different points in time, and in different orders. The HSM 105 can be configured to perform operations corresponding to a cryptographic scheme.

In many schemes, knowledge of a user's private key is often assumed to lie only with the user. Cryptographic schemes can include operations for occasionally generating new keys to mitigate the chance that a nefarious party steals the key of another party. The HSM 105 can be configured to generate and periodically refresh cryptographic keys as part of ensuring the security of a cryptographic scheme implemented by the HSM 105.

Example cryptographic schemes can also include stream ciphers or block ciphers. Other schemes include homomorphic encryption and decryption, threshold ciphers or secret sharing, RSA, or elliptic curve cryptography. Examples of block ciphers that can be implemented include Advanced Encryption Standard (AES), and the various modes in which AES or other block ciphers can be operated in, such as Galois/Counter Mode (GCM), electronic codebook (ECB), or cipher block chaining (CBC).

Some cryptographic schemes may require an initialization vector (IV) or some other source of random or pseudorandom input as part of key generation or encryption. A cryptographic scheme can include operations for generating purely random or pseudorandom values, as part of implementing the scheme. The HSM 105 can be configured for random or pseudorandom number generation. As an example, the HSM 105 can implement a component dedicated for pseudorandom or random number generation, and invoke the component as needed while the HSM 105 performs cryptographic operations.

Another class of cryptographic operations that the HSM 105 can implement includes cryptographic schemes for message authentication, such as message authentication code (MAC) systems. A MAC system can include functions for signing (sign(*)), verifying (verify(•)) and generating keys (KeyGen(•). sign(•) can refer to a class of cryptographic operations for one party (Alice) to sign a message in such a way that another party (Bob) can verify that the message originated from Alice. As an example, $Sign_{key}(m_A)$ can represent a message $m_A$ from Alice that has been signed using a private key known only to Alice. $Sign_{key}(m_A)$ can be equivalent to an encryption of $m_A$ using the private key key.

In this example, Alice can send a request to the HSM 105 to sign a message $m_A$. As described herein, the request sent from Alice can be sent from the user computing device 110 as part of multiple requests defined according to the batch HSM API(s) 100. Bob can receive the signed message plus a copy of the plaintext message ($Sign_{key}(m_A)$, $m_A$) from Alice. Bob can send a request to the HSM 105 to run:

$$verify(Sign_{key}(m_A), m_A)$$

by passing Alice's signed message, the plaintext message, and Alice's public key to the HSM 105. In this MAC system, the HSM 105 is an added layer of protection which can store the cryptographic keys used between communicating parties. $Sign_{key}(m_A)$ can represent the MAC value generated as part of executing a MAC system.

A MAC value can also be referred to as a cryptographic tag, or just tag. Messages can be transmitted between networks, and receiving devices can send a request to verify a particular MAC value received with a message, against the received message, to determine whether the message was authored by the sending party.

Another class of cryptographic operations that the HSM 105 can perform includes cryptographic hash functions. A cryptographic hash function is a hash function with one or more cryptographically-desired qualities, such as deterministic behavior, quick and efficient computation, and with a low or zero likelihood that two input strings will hash to the same output hash value. The HSM 105 can also be configured to perform cryptographic operations as part of one or more cryptographic protocols, such as operations as part of Transport Layer Security (TLS).

As described herein, the user computing device 110, the server computing device 115, and the HSM 105 can execute one or more instructions corresponding to the batch HSM API(s) 100. In general, an API can define functions and data structures for communicating with a device or program. An API can be implemented for communicating with hardware, such as the HSM 105, software, or a combination of the two. An API can be implemented as a hardware or software component, which can be hard coded, such as by using one or more circuits, or programmed, using any of a variety of different programming languages. For example, the API can define one or more functions that when executed, cause a hardware component, such as the HSM 105, to perform one or more operations. Functions of an API can be invoked through requests sent to a device to perform one or more operations defined by the invoked functions.

The batch HSM API(s) 100 can define one or more APIs that further define schemes or functions related to performing different cryptographic tasks. As an example, the batch HSM API(s) 100 can include a batch encrypt API defining operations for batch encrypting plaintexts by the HSM 105. The batch HSM API(s) 100 can also include a batch decrypt API defining operations for batch decrypting ciphertexts by the HSM 105. In addition, the batch HSM API(s) 100 can define other APIs for performing other cryptographic functions by the HSM 105, such as signing and verifying messages, generating MAC values or cryptographic tags, or performing random or pseudorandom number generation. In some implementations, the batch HSM API(s) 100 can define cryptographic operations as a single API, instead of as multiple separate APIs.

The batch HSM API(s) 100 can define one or more data structures and operations for batching and unbatching data. The data in question can be plaintext, such as plaintext received by the user computing device 110. The data can also be ciphertext, such as ciphertext generated from the ciphertext and a cryptographic key stored on the HSM 105.

One example data structure for batching data can include an array, such as a vector, or an array. Each element in the array can represent an individual plaintext/ciphertext, or other type of data to be batched. In addition, the batch data structure can also include a field for storing a key identifier. The key identifier can correspond to the cryptographic key of a user sending a request to process data according to the batch HSM API(s) 100. The cryptographic key can be a key stored on the HSM 105, and the HSM 105 can be configured to identify a stored key corresponding to the key identifier in the batch data structure.

One or more example functions for batching and processing data can receive, as input, a key identifier and a plurality of elements of data to batch. When a function is invoked for performing one or more cryptographic operations on some data, the one or more cryptographic operations and the data together form a request. A request can be sent from a requesting computing device, such as the user computing device 110 and/or the server computing device 115, to the HSM 105. The HSM 105 is configured to receive requests defined in accordance with the batch HSM API(s) 100, as described herein.

In some implementations, a computing device configured to generate a batch request from a key identifier and a plurality of elements of data to batch can generate batch requests according to a predetermined number of elements, per batch. In some examples, the computing device, such as the server computing device 115, can receive a parameter value updating the predetermined number of elements for generating batch requests. Subsequent batch requests generated by the server computing device 115 in this example can include a number of elements equal to the updated parameter value. In some implementations, each batch request includes a parameter value specifying how many individual elements to batch as part of the request.

Example function definitions and data structures for the batch HSM API(s) 100 follow. It is understood that the batch HSM API(s) 100 and corresponding batching logic can be implemented according to a variety of different techniques and in one or more programming languages. TABLES 1-9, below, illustrate pseudocode and are explained as an example of how the batch HSM API(s) 100 can be implemented. Similarly, other cryptographic primitives can have one or more batch HSM APIs, for example one or more batch decrypt APIs, one or more batch sign APIs, and one or more batch verify APIs, as described herein.

TABLE 1 shows an example definition of ciphertext according to the batch HSM API(s) 100.

TABLE 1

| 1 | struct Ciphertext { |
| 2 | string ciphertext; |
| 3 | string iv; |
| 4 | string tag; |
| 5 | } |

Lines 1-5 define a data structure called CipherText. CipherText can include a ciphertext field representing ciphertext, an iv field representing an initialization vector used by the HSM 105 for encrypting the ciphertext, and a tag field representing a tag or signed messaged used to verify an author of the message encrypted by the ciphertext.

TABLE 2 shows an example definition of an encrypted output according to the batch HSM API(s) 100.

TABLE 2

| 1 | struct EncryptResult { |
| 2 | int error_code; |
| 3 | Ciphertext ciphertext; |
| 4 | } |

The HSM 105 can generate an EncryptResult data structure in response to encrypting a plaintext. The error_code in line 2 of TABLE 2 can be a numeric value corresponding to different errors that may occur during encryption. In some implementations, ciphertext in line 3 of TABLE 2 is only populated if the error_code indicates no errors occurred, which can be represented for example by an error_code value of 0.

TABLE 3 shows an example definition of a decrypted ciphertext according to the batch HSM API(s) 100.

TABLE 3

| 1 | struct DecryptResult { |
| 2 | int error_code; |
| 3 | string plaintext; |
| 4 | } |

The HSM 105 can generate a DecryptResult data structure in result to decrypting a ciphertext. Similar to the error_code in line 2 of TABLE 2, the error_code in line 2 of TABLE 3 can be a numeric value corresponding to different errors that may occur during decryption. In some implementations, plaintext in line 3 of TABLE 3 is only populated if the error_code indicates no errors occurred, which can be represented for example by an error_code value of 0.

TABLE 4 shows an example definition of a batch HSM API function for generating a batch data structure storing a batch of encrypted data according to the batch HSM API(s) 100.

TABLE 4

| 1 | vector<EncryptResult> BatchEncrypt ( |
| 2 | int key_identifer, |
| 3 | vector<string> plaintexts |
| 4 | ); |

BatchEncrypt is defined in TABLE 4 as a function that returns a vector of type EncryptResult. A vector as used in the examples of the TABLES described herein can refer to a vector as commonly defined in different programming languages, however the batch HSM API(s) can also define data structures of arrays, or other types of data structures for storing multiple elements. The key_identifier field stores a key identifier identifying a cryptographic key stored on the HSM 105 that is used to encrypt the plaintexts. The HSM 105 can receive a batch data structure that includes a plurality of plaintexts and a key_identifier, which is processed as input by the HSM 105 to perform BatchEncrypt.

TABLE 5 shows an example definition of a batch HSM API function for generating a batch data structure storing a batch of decrypted data according to the batch HSM API(s) 100.

TABLE 5

| 1 | vector<DecryptResult> BatchDecrypt ( |
| 2 | int key_identifer, |
| 3 | vector<Ciphertext> ciphertexts |
| 4 | ); |

BatchDecrypt is defined in TABLE 5 as a function that returns a vector of type DecryptResult. The key_identifier field stores a key identifier identifying a cryptographic key stored on the HSM 105 that is used to decrypt the ciphertexts. Between TABLE 4 and TABLE 5, the key_identifier can be the same, for example in symmetric key cryptographic schemes.

A request that includes a batch data structure is referred to in this specification as a batch request. The HSM 105 can be configured to receive batch requests that include invocations of one or more batch HSM API functions, like BatchEncrypt or BatchDecrypt. The invoked function of a batch request is equivalent to requesting that the HSM 105 to perform one or more cryptographic operations defining the invoked function in the batch HSM API(s) 100.

The batch HSM API(s) 100 can define a batch HSM API function as a predetermined set of cryptographic operations. For example, sending a request by invoking BatchEncrypt to the HSM 105 can cause the HSM 105 to perform RSA encryption on the batch data structure included as part of the request. The batch HSM API(s) 100 can define different variants of BatchEncrypt and other batch functions described here. As an example, the batch HSM API(s) 100 can define BatchRSAEncrypt and BatchECIESEncrypt for performing RSA and elliptic curve integrated encryption schemes, respectively.

The server computing device 115 coupled to the HSM 105 can implement batching logic as described herein for generating batch requests. In particular, the server computing device 115 can be configured to generate a request that includes a batch data structure of data elements and a key_identifier, and an invocation of a defined batch function in the batch HSM API(s) 100 that causes the HSM 105 to perform one or more cryptographic operations corresponding to the invoked function.

The batch HSM API(s) 100 can further define batch data structures and functions for other cryptographic tasks, such as key generation or signature and verification. TABLEs 6-9 show example definitions in the batch HSM API(s) 100 for batch signing and batch verifying on the HSM 105. The functions and data structures shown in TABLEs 6-9 can be defined as part of one or more batch HSM APIs, such as a batch sign API or a batch verify API.

TABLE 6 shows an example definition of a signed result according to the batch HSM API(s) 100.

TABLE 6

| 1 | struct SignResult { |
| 2 | int error_code; |
| 3 | string signature; |
| 4 | } |

The SignResult data structure as defined in TABLE 6 can include a signature field representing a signed message or tag, and an error_code field indicating errors, if any. The HSM 105 can generate a SignResult data structure in response to a request to perform one or more cryptographic operations for signing some input.

TABLE 7 shows an example definition of a verified signature according to the batch HSM API(s) 100.

TABLE 7

| 1 | struct VerifyInput { |
| 2 | string signature; |
| 3 | string message; |
| 4 | } |

The VerifyInput data structure can include a signature field for storing a signed message, and a message field for storing a message that was signed. As described herein, the HSM 105 can perform one or more cryptographic operations for performing verification, for example by determining that the signed message matches the message after applying the public key of a user of the sending device to the signed message.

TABLE 8 shows an example definition of a batch HSM API function for signing a batch of messages as defined by the batch HSM API(s) 100.

TABLE 8

| 1 | vector<SignResult> Batchsign ( |
| 2 | int key_identifer, |
| 3 | vector<string> messages |
| 4 | ); |

BatchSign can be defined as in TABLE 8 as a batch function that returns a vector of type SignResult. The key_identifier field stores a key identifier identifying a cryptographic key stored on the HSM 105 that is used to sign the messages stored in the messages data structure in line 3 of TABLE 8. The HSM 105 can receive a batch request that includes a batch data structure of messages to sign, and an invocation of the BatchSign function to cause the HSM 105 sign each message in the batch data structure.

TABLE 9 shows an example definition of a batch data structure that stores a batch data structure of signed messages as defined by the batch HSM API(s) 100.

TABLE 9

| 1 | vector<Boolean> BatchVerify ( |
| 2 | int key_identifer, |
| 3 | vector<VerifyInput> inputs |
| 4 | ); |

BatchVerify can be defined as in TABLE 9 as a batch function that returns a vector of Boolean values, such as true/false or 1/0 depending on the programming language used to implement the batch HSM API(s) 100. The key_identifier field stores a key identifier identifying a cryptographic key that is used to verify the data elements of type VerifyInput in the vector inputs. Recall from TABLE 7 that each data element of type VerifyInput includes a signature field representing a signed message, and a message field representing the message signed. The HSM 105 can receive a batch request that includes an invocation of the batch function Bat chVerify and a batch data structure of inputs that each include a signed message and a message for comparison.

The output Boolean vector can be an output batch structure, each individual output in the batch structure corresponding to a determination of whether a signed message in the batch data structure of the request was valid. The HSM 105 can be configured to generate the order of data elements in the output batch structure to match the order of the corresponding input data elements.

The HSM 105 can be configured to use a particular algorithm for performing verification, for example using RSA and a cryptographic key stored on the HSM 105 and identified by the key_identifier field. In some implementations, the batch HSM API(s) 100 can define different variants of BatchSign and BatchVerify, such as Bat chRSASign and BatchRSAVerify.

The devices 110, 115 can implement the batching logic for receiving and batching requests to perform cryptographic operations on individual data elements, such as individual plaintexts or ciphertexts. The device receiving the individual requests can batch the requests together and generate a batch request with a respective batch data structure storing the data elements of the individual requests. As described herein with reference to FIGS. 1 and 9, a computing device coupled to the HSM 105 can be configured to buffer individual requests to the HSM 105, and buffer those requests according to one or more conditions, to generate a corresponding batch request.

The HSM 105 can include plurality of processors 252 and one or more cryptoprocessors 254 configured for processing batch data structures as defined by the batch HSM API(s) 100. As an example, the HSM 105 can be configured to receive a batch data structure at the processor(s) 252, which can include a general-purpose processor like a central processing unit (CPU). The general-purpose processor can be configured to perform pre-processing operations, such as input validation on each data element of a batch data structure. Batch operations performed by the general-purpose processor can refer to the general-purpose processor receiving a batch data structure as input instead of individual data elements, and performing one or more operations on the entire batch, such as input validation, instead of operations performed one-by-one on individual data elements.

Input validation can refer to verifying whether a data element is properly formatted for processing by the HSM 105. As an example, the HSM 105 may validate a data element against a list of data structures defined by the batch HSM API(s) 100, to determine whether the data element is defined according to one of those data structures. If not, the HSM 105 can send an error code to the requesting computing device and/or the server computing device 115 coupled to the HSM 105.

In some implementations, the general-purpose processor performs input validation on each data element of a batch data structure individually, in addition or as an alternative to performing input validation on the batch data structure as a whole.

Another example of a pre-processing operation that can be performed by the general-purpose processor is determining whether the size of the input elements of the batch data structure are appropriate for the key type of the key identified by the key identifier and/or appropriate for the type of cryptographic operation requested to be performed on the input elements. If the size or other characteristic of the input elements is not appropriate, the general-purpose processor can be configured to reject the batch request, and optionally send an indication of the rejection to a requesting computing device.

Another example of a pre-processing operation that can be performed by the general-purpose processor is determining whether the size of the input elements of the batch data structure is appropriate for the cryptoprocessor. A cryptoprocessor may have specifications for the size or format of data received for processing, therefore the general-purpose processor can reject a batch request having individual elements that do not meet this size or format.

The general purpose processor of the processor(s) 252 can send the validated batch request to one or more cryptoprocessors of the cryptoprocessor(s) 254. The HSM 105 can implement a single cryptoprocessor for performing cryptographic operations, or multiple cryptoprocessors, each with one or more processing cores. In some implementations, the HSM 105 implements different cryptoprocessors for different operations, for example because some cryptoprocessors are configured for hardware acceleration. The cryptoprocessor(s) 254 can be configured for receiving a batch data structure as input, and processing each data element of the batch data structure to generate a respective result. The batch HSM API(s) 100 can define a maximum or minimum size for a batch data structure in accordance with a cache space implemented on the HSM 105.

For example, a cryptoprocessor can be configured to encrypt x kilobytes of plaintext data at once. Therefore, in some implementations the batch HSM API(s) 100 can define a maximum batch size of a batch data structure for x kilobytes. The batch HSM API(s) 100 can define different batch data structure sizes so that multiple structures can be processed concurrently on a cryptoprocessor, such as two data structures of x/2 kilobytes each, or four data structures of x/4 kilobytes. In some implementations a computing device configured to receive and batch individual requests into a batch request may do so according to one or more conditions. When the conditions are met, as described in more detail herein with reference to FIGS. 4-8, then the computing device can be configured to send a batch request with a batch data structure of some size that can be the same size or smaller than a maximum size specified by the batch HSM API(s) 100.

An HSM in some implementations can be modified to implement batch operations according to aspects of the disclosure described herein. For example, an HSM may already be configured to perform cryptographic operations, such as encryption or decryption, on an input, but not necessarily a batched input. In some implementations, a computing device coupled to the HSM can be configured to send batch data structures in a format that, from the perspective of the HSM, appears to be a single data element for processing. For example, the batch HSM API(s) 100 can define a batch data structure that represents a concatenation of multiple individual data elements. A computing device implementing the batch HSM API(s) 100 in this example can generate a batch data structure as a concatenation of multiple data elements, and send the batch data structure to the HSM. The HSM can process and output a corresponding result representing a concatenation of individual results for each input data element concatenated in the batch data structure.

The computing device coupled to the HSM can be configured to parse the individual results from the concatenated output, for example because each output is known to be at a fixed size or is encoded to end in a predetermined format. The computing device can then perform further processing as required on the parsed output, and/or send the parsed output to a requesting computing device that previously requested that the individual data elements be processed by the HSM.

As shown in FIG. 1, the server computing device 115 can be coupled to one or more storage devices 230. The storage device(s) 230 can be a combination of volatile and non-volatile memory, and can be at the same or different physical locations than the server computing device 115. For example, the storage device(s) 230 can include any type of non-transitory computer readable medium capable of storing information, such as a hard-drive, solid state drive, tape drive, optical storage, memory card, ROM, RAM, DVD, CD-ROM, write-capable, and read-only memories. The storage device(s) 230 may store, for example, data files, documents, code, schemas, applications, or any of a variety of other information or tools typically stored in databases.

The server computing device 115 can include one or more processors 212 and memory 214. The memory 214 can store information accessible by the processor(s) 212, including instructions 216 that can be executed by the processor(s) 212. The memory 214 can also include data 218 that can be retrieved, manipulated or stored by the processor(s) 212. The memory 214 can be a type of non-transitory computer readable medium capable of storing information accessible by the processors 212, such as volatile and non-volatile memory. The processor(s) 212 can include one or more central processing units (CPUs), graphic processing units (GPUs), field-programmable gate arrays (FPGAs), and application-specific integrated circuits (ASICs), such as tensor processing units (TPUs).

The instructions 216 can be one or more instructions that when executed by the processor(s) 212, causes the processor(s) 212 to perform actions defined by the instructions. The instructions 216 can be stored in object code format for direct processing by the processors 212, or other in other formats including interpretable scripts or collections of independent source code modules that are interpreted on demand or compiled in advance. In this regard, the terms "instructions," "steps" and "programs" can be used interchangeably herein.

The instructions 216 include instructions for implementing the batch HSM API(s) 100. The instructions for implementing the batch HSM API(s) 100 can include instructions, that when executed by the processor(s) 212, causes the processor(s) 212 to be able to perform operations such as receiving individual requests from requesting computing devices like the user computing device 110 for performing cryptographic operations on the HSM 105. As described herein with reference to FIGS. 4-8, the server computing device 115 can be configured to generate batch requests from individual requests sent from requesting computing devices, send batch requests to the HSM 105, and receive output batch data structures from the HSM 105 in response to the sent batch requests.

The data 218 can be retrieved, stored, or modified by the processors 212 in accordance with the instructions 216. The data 218 can be stored in computer registers, in a relational or non-relational database as a table having a plurality of different fields and records, or as JSON, YAML, proto, or XML documents. The data 218 can also be formatted in a computer-readable format such as, but not limited to, binary values, ASCII or Unicode. Moreover, the data 218 can include information sufficient to identify relevant information, such as numbers, descriptive text, proprietary codes, pointers, references to data stored in other memories, including other network locations, or information that is used by a function to calculate relevant data.

The user computing device 110 can also be configured similar to the server computing device 115, with one or more processors 213, memory 221, instructions 217, and data 219. The user computing device 110 can also include a user input 224, and a user output 225. The user input 224 can include any appropriate mechanism or technique for receiving input from a user, such as keyboard, mouse, mechanical actuators, soft actuators, touchscreens, microphones, and sensors.

The server computing device 115 can be configured to transmit data to the user computing device 110, and the user computing device 110 can be configured to display at least a portion of the received data on a display 222 that can be implemented as part of the user output 225. The user output 225 can also be used for displaying an interface between the user computing device 110 and the server computing device 115. The user output 225 can alternatively or additionally include one or more speakers, transducers or other audio outputs, a haptic interface or other tactile feedback that provides non-visual and non-audible information to the platform user of the user computing device 110.

The user computing device 110 can also be configured for generating requests to process data on the HSM 105 as defined by the batch HSM API(s) 100. The user computing device 110 can be configured to generate requests to perform cryptographic operations by the HSM 105 on input data, and to send the requests to the server computing device 115. In some implementations and as described herein with reference to FIGS. 4-8, the user computing device 110 can be configured to generate batch requests, send batch requests to the server computing device 115, and to receive output batch data structures corresponding to the sent batch requests.

The HSM 105 can also be configured with one or more processors 252, one or more cryptoprocessors 254, memory 256, instructions 258, and data 260. As described herein with reference to FIG. 1, the one or more processors 252 can include a general-purpose processor configured to perform pre-processing operations, such as batching, unbatching, and input validation.

Although FIG. 1 illustrates the processors 212, 213 and the memories 214, 221 as being within the computing devices 110, 115, components described in this specification, including the processors 212, 213 and the memories 214, 221 can include multiple processors and memories that can operate in different physical locations and not within the same computing device. For example, some of the instructions 216, 217 and the data 218, 219 can be stored on a removable CD-ROM and others within a read-only computer chip. Some or all of the instructions and data can be stored in a location physically remote from, yet still accessible by, the processors 212, 213. Similarly, the processors 212, 213 can include a collection of processors that can perform concurrent and/or sequential operation. The computing devices 110, 115 can each include one or more internal clocks providing timing information, which can be used for time measurement for operations and programs run by the computing devices 110, 115.

In addition, although description is made with reference to a single user computing device 110, server computing device 115, and HSM 105, it is understood that aspects of this disclosure can be implemented by multiple devices and HSMs, for example in sequence or concurrently. The network 125 can be a network for a distributed system of devices, in which multiple devices and HSMs process data and communicate according to aspects of this disclosure.

Together, the server computing device 115, the HSM 105, the user computing device 110 and optionally one or more other devices coupled to the network 125 can at least partially implement any of a number of architectures and technologies, including, but not limited to, direct attached storage (DAS), network attached storage (NAS), storage area networks (SANs), fiber channel (FC), fiber channel over Ethernet (FCoE), mixed architecture networks, or the like. Further, in some examples devices coupled by the network 125 can at least partially implement virtualized or containerized environments. For example, the server computing device 115 and/or the user computing device 110 may include one or more virtual machines running on a host machine.

Figure 2:
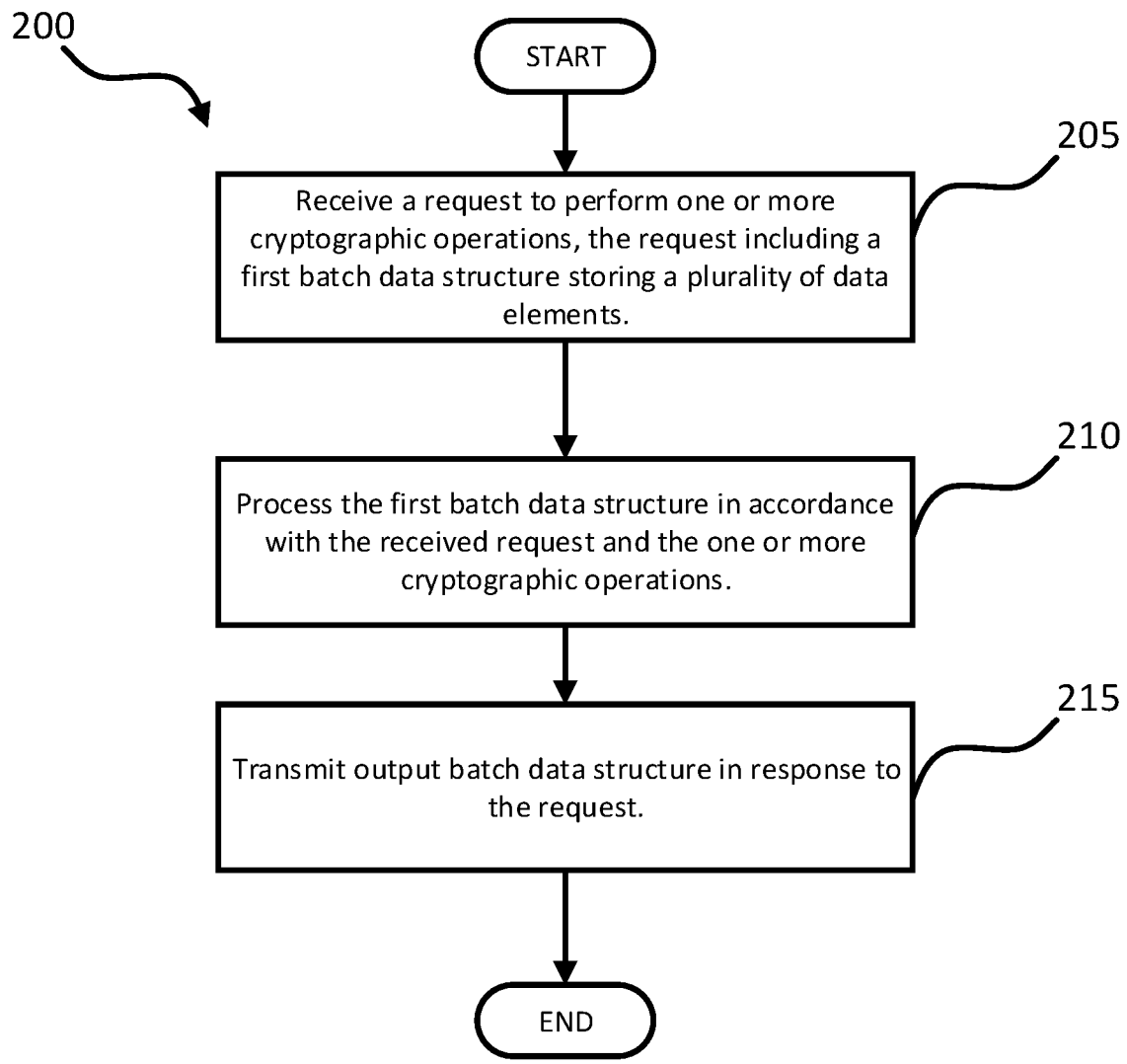
FIG. 2 is a flow diagram showing an example process for performing batch cryptography using a hardware security module.

FIG. 2 is a flow diagram showing an example process 200 for performing batch cryptography using a hardware security module. The process 200 is described as being performed by an HSM, configured in accordance with aspects of this disclosure. For example, the HSM 105, appropriately configured, can perform the process 200. Steps of the process 200 can be performed in different orders, with additional steps added or some steps as shown in the process 200 removed.

The HSM receives 205, a request to perform one or more cryptographic operations. As described herein with reference to FIG. 1, the request can include a first batch data structure storing a plurality of data elements. Each data element can be some data to be processed by the HSM using the one or more cryptographic operations. For example, the data elements can be plaintexts and the one or more operations can be operations for encrypting the plaintexts. The request can also include a key identifier, identifying a key stored on memory coupled to the HSM for the HSM to use while performing the one or more cryptographic operations.

Figure 3:
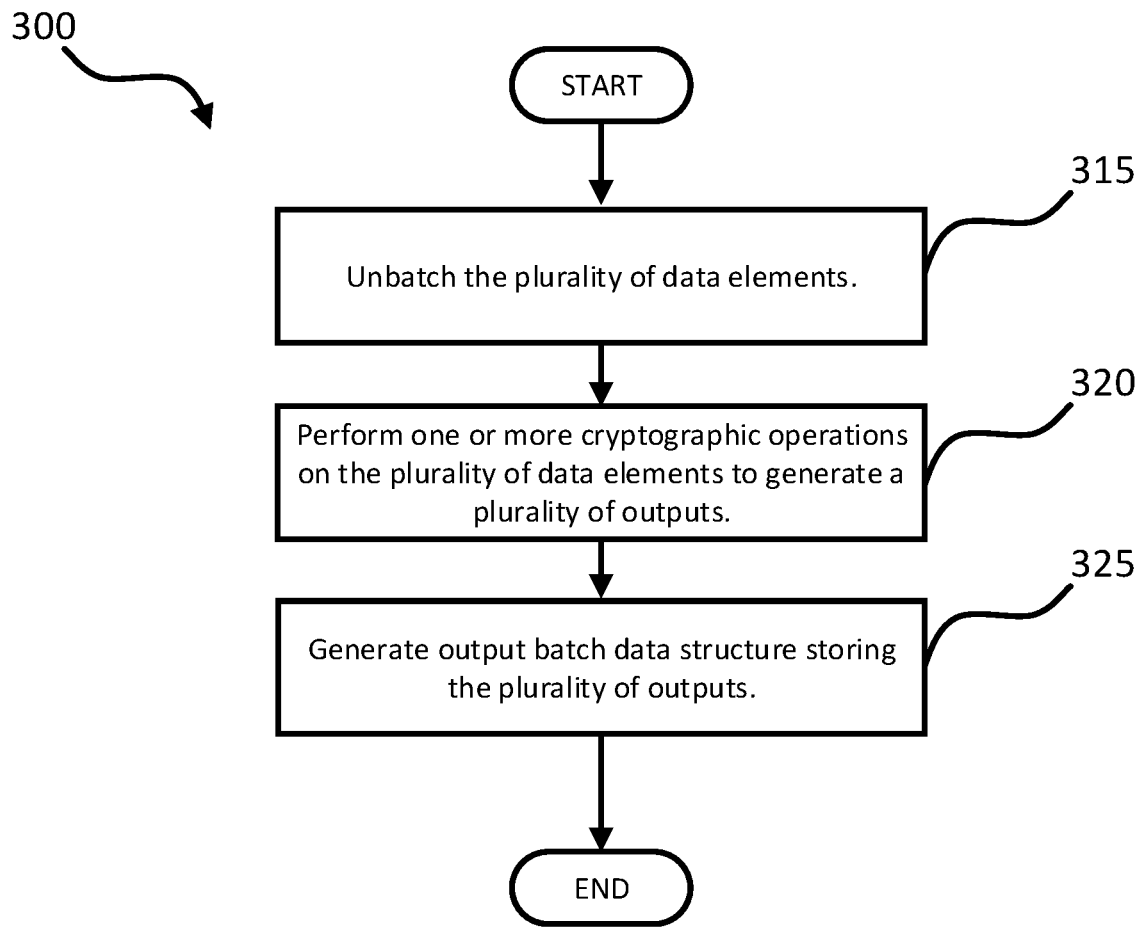
FIG. 3 is a flow diagram showing an example process for processing a batch data structure in accordance with a received request and one or more cryptographic operations.

The HSM processes 210 the first batch data structure in accordance with the received request and the one or more cryptographic operations. The HSM can read the one or more cryptographic operations specified by the batch request, and perform the operations specified. FIG. 3, herein, describes an example process for processing the batch data structure. The HSM transmits 215 the output batch data structure in response to the received request.

FIG. 3 is a flow diagram showing an example process 300 for processing a batch data structure in accordance with a received request and one or more cryptographic operations.

The HSM can unbatch 315 the plurality of data elements from the first batch data structure. As described herein with reference to FIGS. 1-8, the HSM can be configured to unbatch data elements from a received batch data structure.

In some implementations, the HSM can subdivide a received batch into smaller sub-batches, for example to divide the batch data structure for processing across multiple cryptoprocessors or respective processing cores for one or more cryptoprocessors.

The HSM can include a general-purpose processor configured to receive the batch data structure, and perform pre-processing operations like data verification to ensure that the data elements are in a format that the HSM is configured to process. The general-purpose processor, after unpacking the data elements, can pass the data elements to a second processor for performing 320, the one or more cryptographic operations. The second processor can be a cryptoprocessor specially configured for performing the one or more cryptographic operations. In some implementations, the HSM implements a single processor configured to pre-process the batch data structure, such as to validate and unpack the data elements, and then perform 320, the one or more cryptographic operations on the pre-processed data elements.

The second processor can unbatch the data elements from the batch data structure, and perform one or more cryptographic operations on the data elements as specified by the batch request. For example, the second processor can unbatch plaintexts from a received batch data structure, and encrypt each plaintext according to an encryption function specified by the batch request and the cryptographic key corresponding to the key identifier received as part of the batch request. Also as part of the processing 210, the HSM can generate 325 an output batch data structure storing a plurality of outputs generated by performing 320 the one or more cryptographic operations on the plurality of data elements. The second processor that processed the individual data elements can send the output batch data structure back to the first processor, which may be configured for communicating data to devices external to the HSM.

Referring back to FIG. 2, the HSM transmits 215 the output batch data structure in response to the request. The HSM can transmit the output batch structure to a server computing device coupled to the HSM, which in turn can send the output batch structure to a requesting user computing device. The server computing device can send the output batch structure to the user computing device as a batch, or the server computing device can send the outputs individually to the user computing device.

In some implementations, the server computing device or some other computing device coupled to the HSM sends the requests. In those implementations, the HSM can reply to the request by transmitting 215 the output batch data structure to the requesting device coupled to the HSM.

FIGS. 4-8 illustrate example methods for batch processing by an HSM, such as batch encryption and decryption and other functions. While operations included in each method may be described in a particular order, it should be understood that operations may be performed in a different order or simultaneously. Moreover, operations may be added or removed.

Figure 4:
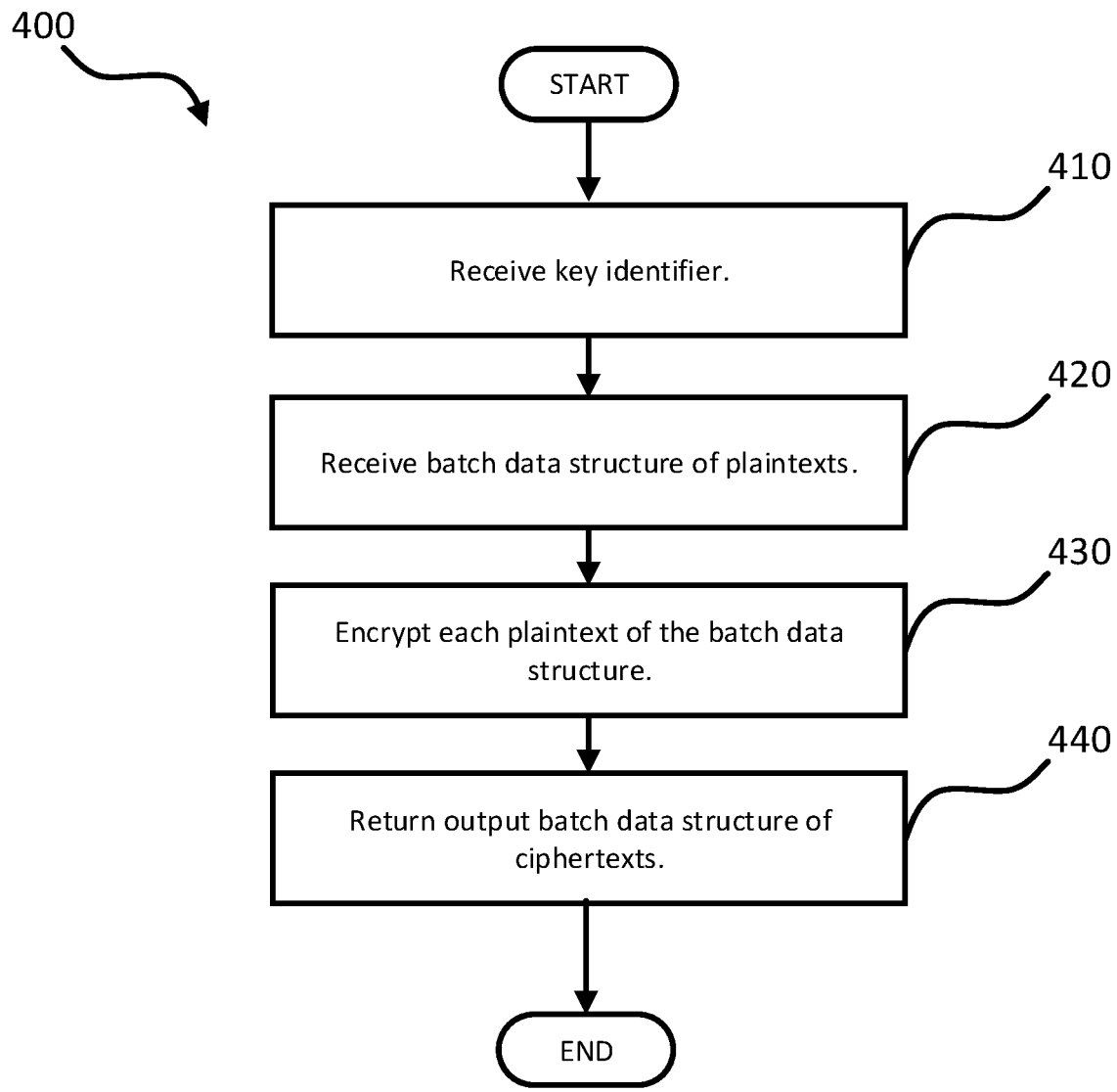
FIG. 4 is a flow diagram illustrating an example batch encryption process performed on an HSM.

FIG. 4 is a flow diagram illustrating an example batch encryption process 400 performed on an HSM. The HSM receives 410, a key identifier identifying a cryptographic key stored on the HSM. The HSM receives 420, a batch data structure that includes multiple plaintexts for encrypting on the HSM using the cryptographic key identified by the key identifier. The HSM can receive the key identifier and the batch data structure as part of a batch request. The batch request can be formed in accordance with a batch encrypt API, which can form part of the one or more batch HSM APIs. The HSM encrypts 430 each plaintext in the batch data structure of plaintexts into respective ciphertexts of an output batch structure of ciphertexts. The batch data structures can be vectors or arrays, as examples. The HSM returns 440, the batch output data structure, for example to a requesting computing device that sent the key identifier and the batch data structure of plaintexts, or to a server computing device coupled to the HSM.

Figure 5:
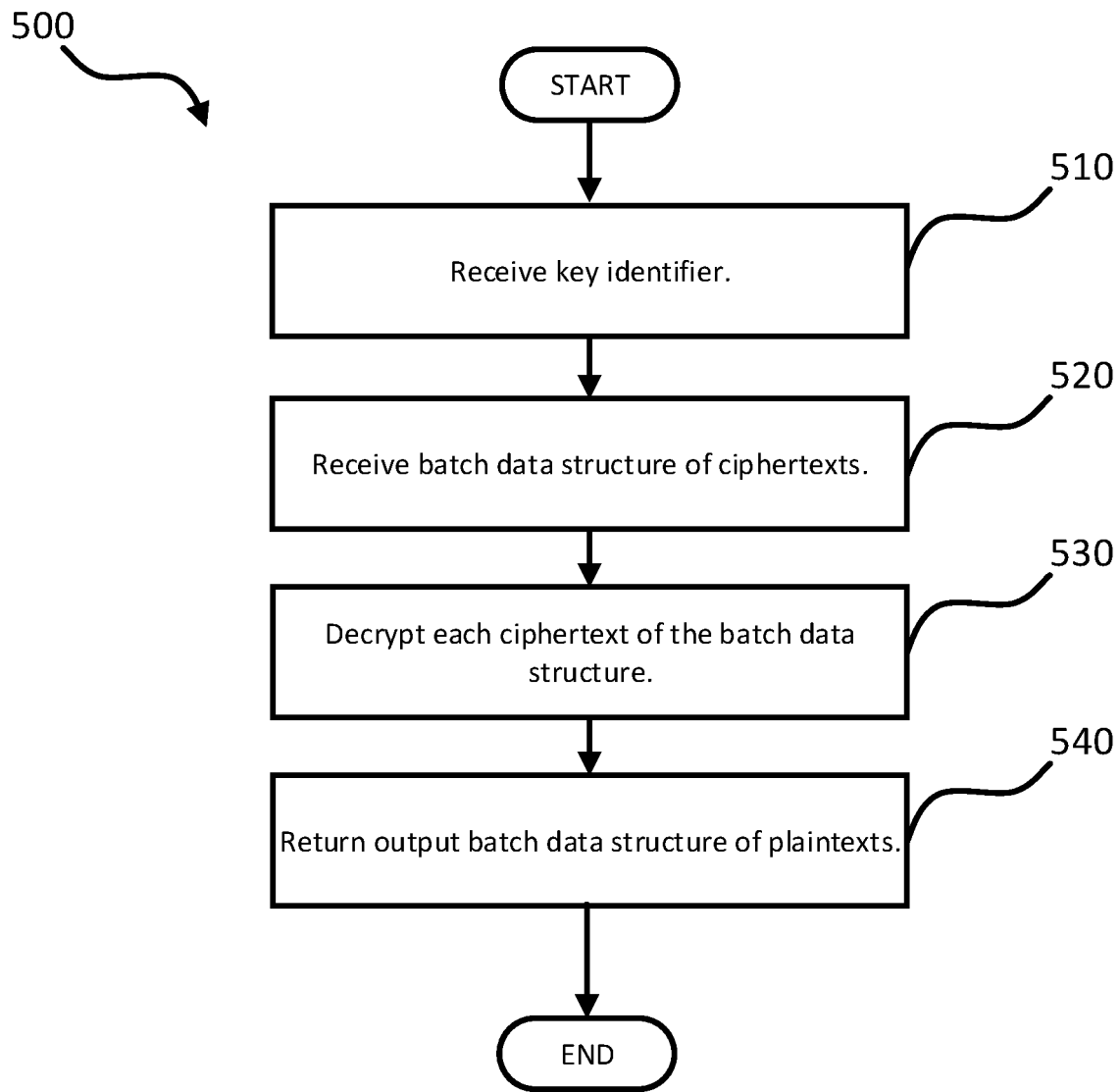
FIG. 5 is a flow diagram illustrating an example batch decryption process performed on an HSM.

FIG. 5 is a flow diagram illustrating an example batch decryption process 500 performed on an HSM. As shown in FIG. 5, the HSM receives 510, a key identifier identifying a cryptographic key stored on the HSM. The HSM receives 520, a batch data structure that includes multiple ciphertexts for decrypting on the HSM using the cryptographic key identified by the key identifier. The HSM can receive the key identifier and the batch data structure as part of a batch request. The batch request can be formed in accordance with a batch decryption API, which can form part of the one or more batch HSM APIs. The HSM decrypts 530 each ciphertext of the batch data structure of ciphertexts into respective plaintexts of an output batch structure of plaintexts. The batch data structures can be vectors or arrays, as examples. The HSM returns 540, the batch output data structure, for example to a requesting computing device that sent the key identifier and the batch data structure of plaintexts, or to a server computing device coupled to the HSM.

Figure 6:
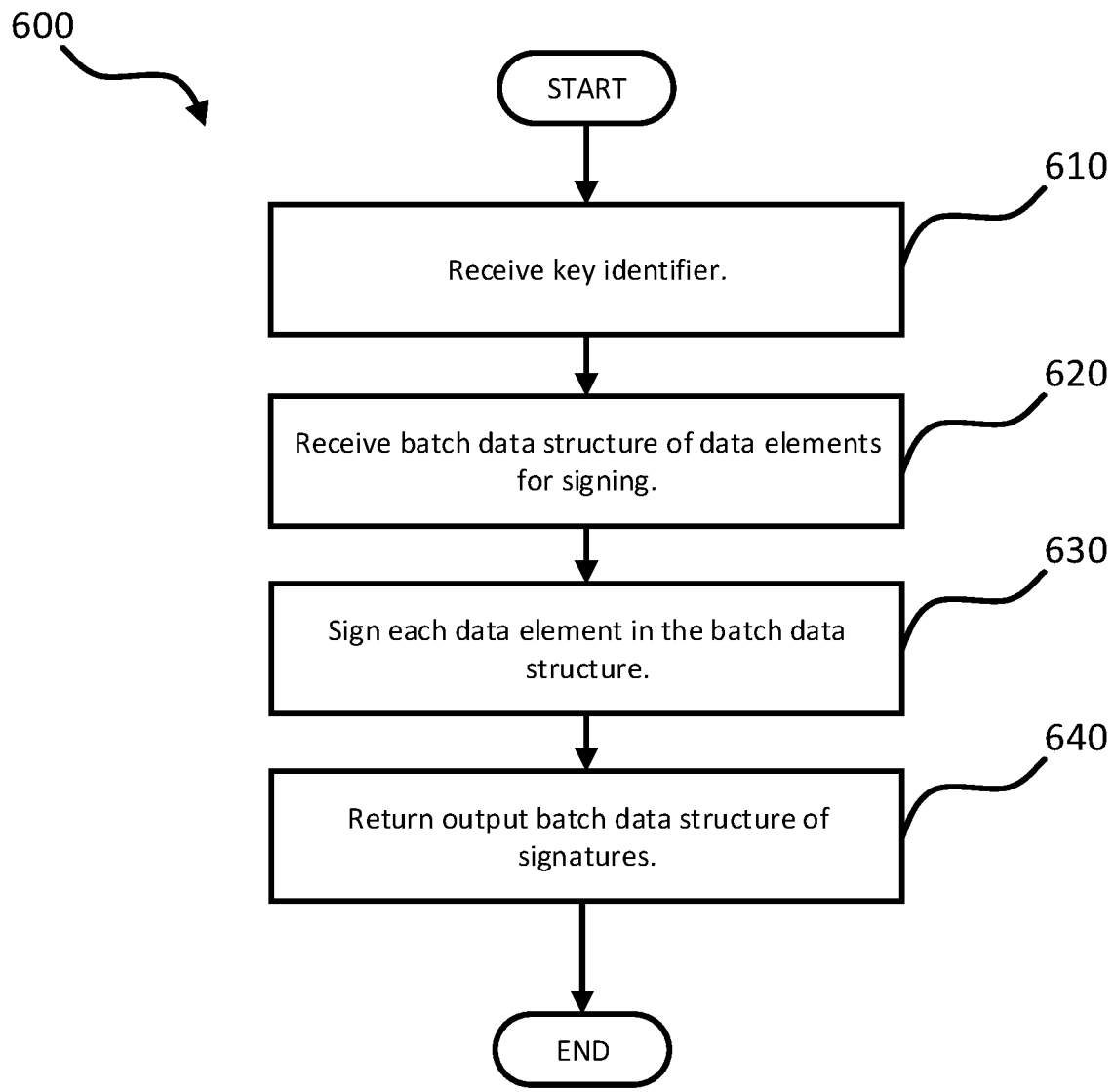
FIG. 6 is a flow diagram illustrating an example batch signing process performed on an HSM.

FIG. 6 is a flow diagram illustrating an example batch signing process 600 performed on an HSM. The HSM receives 610, a key identifier identifying a cryptographic key stored on the HSM. The HSM receives 620, a batch data structure that includes multiple data elements for signing by the HSM using the cryptographic key identified by the key identifier. The HSM can receive the key identifier and the batch data structure as part of a batch request. The batch request can be formed in accordance with a batch signing API, which can form part of the one or more batch HSM APIs. The HSM signs 630 each data element of the batch data structure to generate respective signatures of an output batch structure of signatures. The batch data structure and output batch data structure can be vectors or arrays, as examples. The HSM returns 640, the batch output data structure, for example to a requesting computing device that sent the key identifier and the batch data structure of data elements to sign, or to a server computing device coupled to the HSM.

Figure 7:
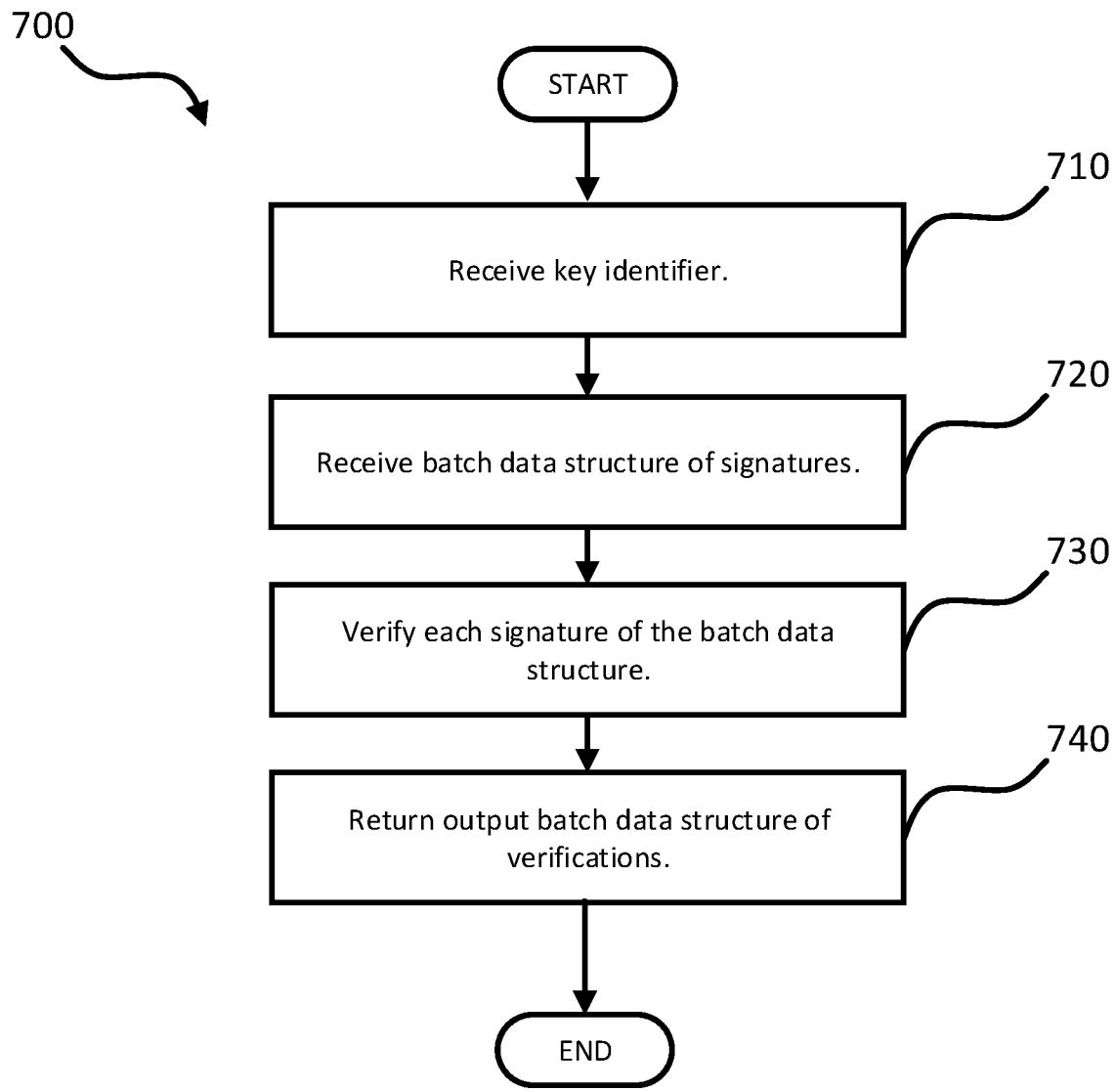
FIG. 7 is a flow diagram illustrating an example batch verification process performed on an HSM.

FIG. 7 is a flow diagram illustrating an example batch verification process 700 performed on an HSM. The HSM receives 710 a key identifier identifying a cryptographic key stored on the HSM. The HSM receives 720 a batch data structure that includes multiple data elements for signing by the HSM using the cryptographic key identified by the key identifier. The HSM can receive the key identifier and the batch data structure as part of a batch request. The batch request can be formed in accordance with a batch verifying API, which can form part of the one or more batch HSM APIs. The HSM verifies 730 each data element of the batch data structure to generate respective verifications of an output batch structure of verifications, which can be represented, for example as an array of Boolean values, with each value corresponding to whether a corresponding signature of the batch structure was successfully verified or not. The HSM returns 740 the batch output data structure, for example to a requesting computing device that sent the key identifier and the batch data structure of data elements to sign, or to a server computing device coupled to the HSM.

Figure 8:
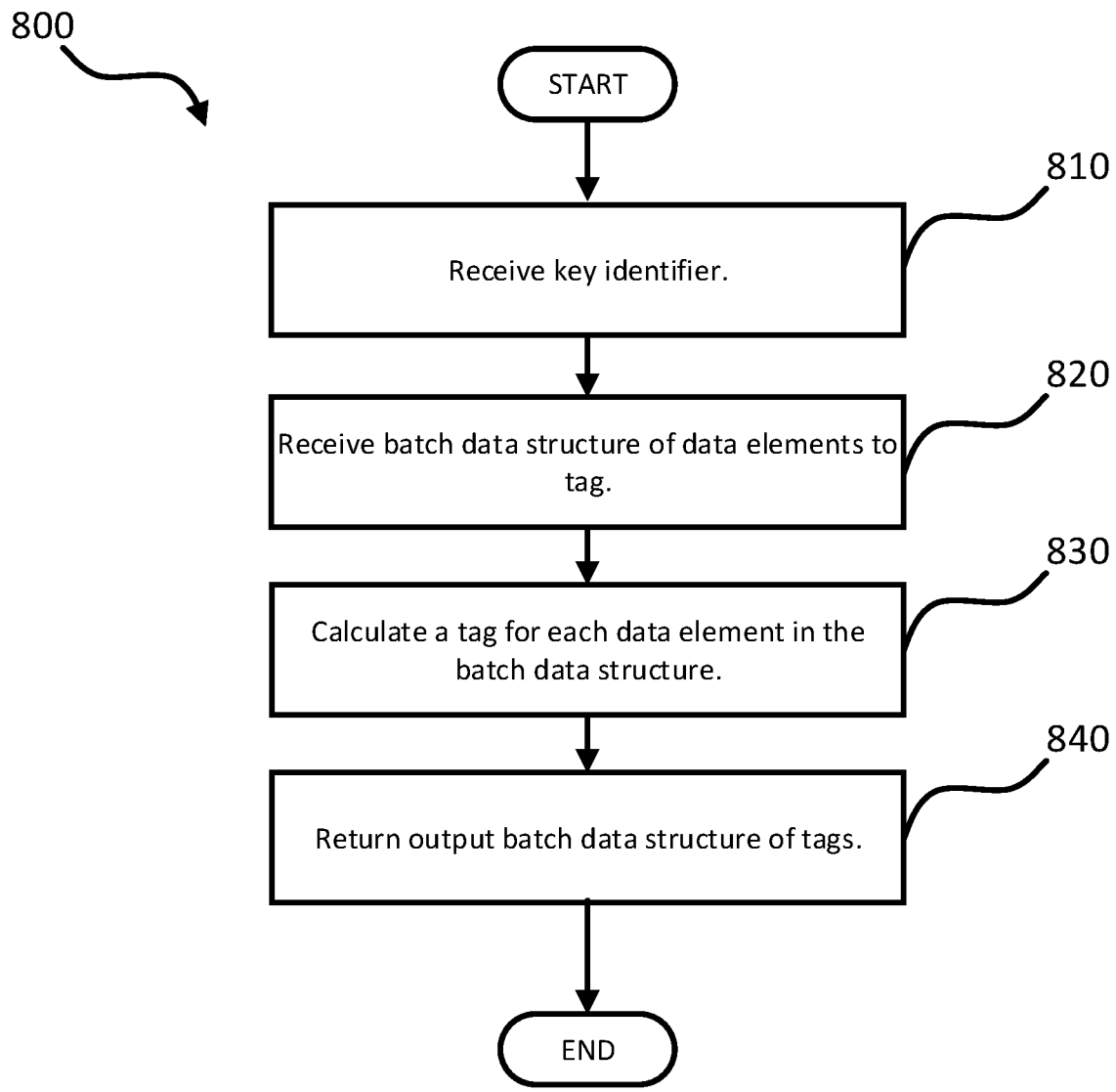
FIG. 8 is a flow diagram illustrating an example MAC process performed on an HSM.

FIG. 8 is a flow diagram illustrating an example MAC process 800 performed on an HSM. The HSM receives 810 a key identifier identifying a cryptographic key stored on the HSM. The HSM receives 820 a batch data structure that includes multiple data elements for generating cryptographic tags by the HSM using the cryptographic key identified by the key identifier. The HSM can receive the key identifier and the batch data structure as part of a batch request. The data elements can be messages, and the tags generated can be used as part of a verification scheme to verify that the author of the tagged message is the author corresponding to the cryptographic key identified by the key identifier. The batch request can be formed in accordance with a batch MAC API, which can form part of the one or more batch HSM APIs. The HSM calculates 830 the tag for each data element of the batch data structure to generate respective tags for an output batch structure of tags. The tags are generated in accordance with a MAC scheme identified in the batch request. In some implementations, each element in the output batch data structure can include a tag, as well as the message that was tagged. The batch data structure and output batch data structure can be vectors or multi-dimensional arrays, as examples. The HSM returns 840 the batch output data structure, for example to a requesting computing device that sent the key identifier and the batch data structure of data elements to generate MAC values, or to a server computing device coupled to the HSM.

Figure 9:
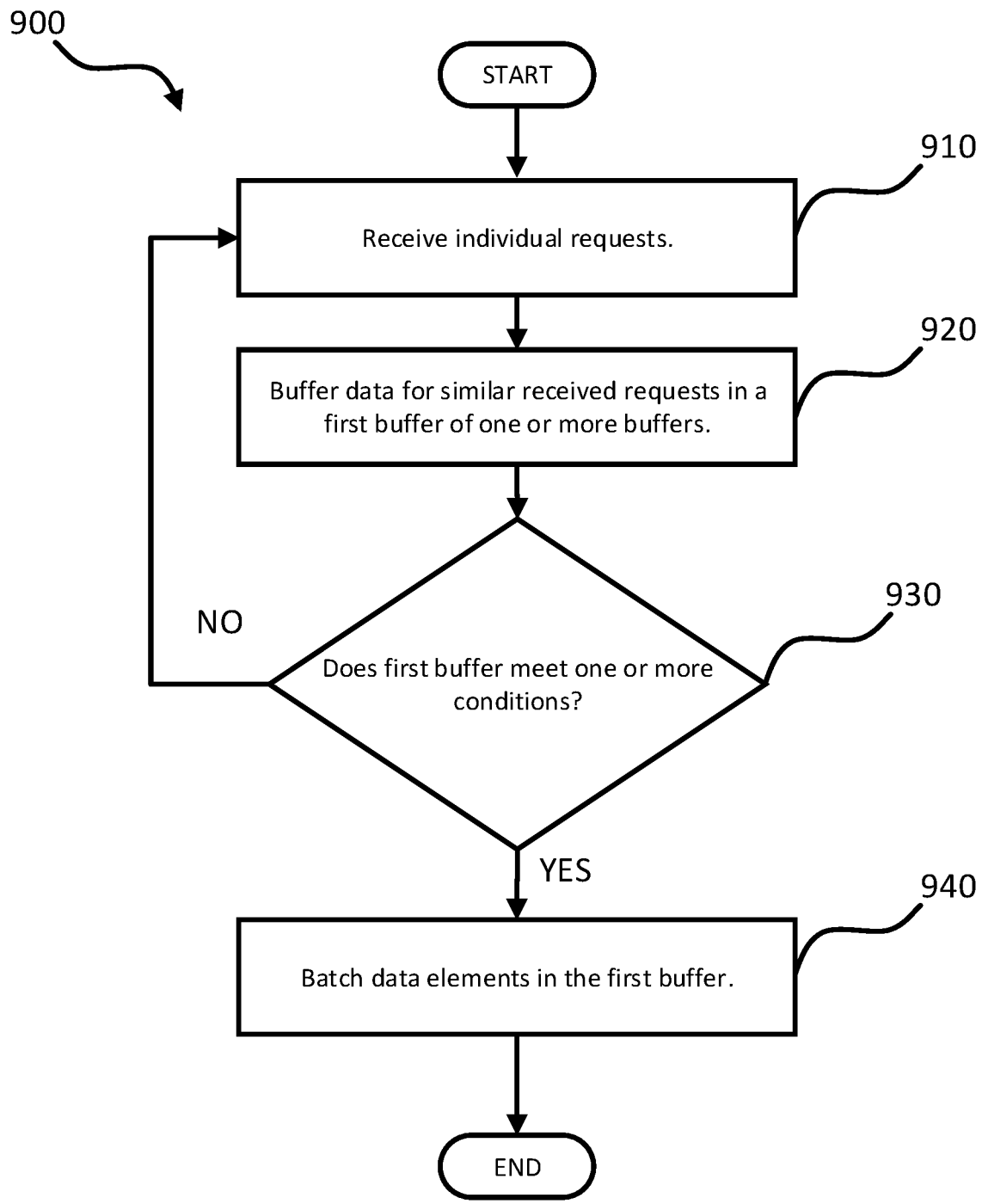
FIG. 9 is a flow diagram of an example process for proxy batching requests for an HSM.

FIG. 9 is a flow diagram of an example process 900 for proxy batching requests for an HSM. The process 900 is described as being performed by a server computing device coupled to the HSM. For example, the server computing device 115, appropriately programmed, can perform the process 900. While the operations of the process 900 are described in a particular order, they can be performed in different orders, and operations may be added or omitted.

Proxying batch requests can be advantageous for managing traffic to the HSM. For example, a server computing device coupled to the HSM can manage incoming traffic so that outgoing traffic to the HSM is sent in batches, instead of individual requests. In doing so, the server computing device can control the pace at which requests are sent to the HSM, particularly during periods of high-volume or bursty traffic.

The server computing device receives 910 individual requests. The individual requests can be requests to process individual data elements, such as individual plaintexts or ciphertexts. An individual request may include a key identifier, if a corresponding cryptographic key stored on the HSM is required to perform the requested operations.

The server computing device buffers 920 similar received requests in a first buffer of one or more buffers in memory coupled to the server computing device. Two requests can be considered similar if each request includes the same key identifier for a cryptographic key stored in the HSM. As another example, requests can be considered similar if the requests come from the same requesting computing device, such as the computing device, and specify performing the same cryptographic operations on the HSM.

As part of proxying batch requests, the server computing device can maintain one or more buffers. Each buffer can be implemented in memory coupled to the server computing device and define one or more data structures for storing data elements from the plurality of requests in each buffer. The server computing device can generate a buffer for each unique key identifier received during a predetermined buffer period, for example 5 milliseconds. As another example, the server computing device can generate separate buffers from requests received from different requesting computing devices. As the server computing device receives requests, the device can determine whether a buffer has been generated for similar requests. If the server computing device determines a buffer for similar requests already exists, the device can store the data element of the request in the identified buffer. Otherwise, the server computing device can generate a new buffer for the received request, and may add subsequent requests that are similar to the received request.

Buffering contents over even a small buffer period such as 5 milliseconds can improve throughput to the HSM 105. For example, assume the server computing device is configured to batch requests received from the user computing device and/or other requesting computing device over a buffer period of 5 milliseconds, and further assume the average rate at which the server computing device receives requests is 5,000 RPS (requests-per-second). In this example, the server computing device generates a batch request for the contents for each buffer after the buffer period elapses.

The average contents size at the end of the buffer period can be 25 data elements (5,000 RPS*0.005 seconds=25 requests). If each data element is 32 bytes, the average content size of each buffer can be 800 bytes. The server computing device can then generate and send batch requests for the HSM to process 800 bytes of data at a time, which can have less computational overhead as described herein with reference to FIG. 1, as compared with processing each request individually during the same buffer period. The length of the buffer period can be determined based on the average size of the contents of each buffer at the end of the buffer period, and the maximum amount of data the HSM can process at once.

The server computing device determines 930, whether the first buffer meets one or more conditions for generating a batch request from the contents of the first buffer. If not, the server computing device can continue to receive 910 and buffer 920 data from individual data requests, until the one or more conditions are met. If the server computing device determines 930 that the one or more conditions have been met, the server computing device batches 940, the data elements stored in the first buffer into a single batch request.

The one or more conditions can be any of a variety of different conditions that, when met, causes the server computing device to generate a batch request from contents of a buffer meeting the one or more conditions. As an example, the one or more conditions can include a condition that specifies to generate a batch request after the buffer period elapses. For example, if the buffer period is 5 milliseconds, then the server computing device can be configured to generate, for each non-empty buffer, a respective batch request with a batch data structure including the contents of the non-empty buffer. Other conditions can also be applied, in addition or as an alternative to the condition specifying that batch requests are generated after a buffer period elapses.

As an example, the one or more conditions can include a condition that specifies to generate a batch request when a data element stored in a buffer meets a predetermined maximum age. The age of a data element can be defined as the duration between the time a data element is added to the buffer, and the current time, which the server computing device can continuously maintain. If the age for a data element meets the predetermined maximum age, the server computing device can generate a batch request with a batch data structure that includes the contents of the buffer at the time the condition is met.

As another example in addition or as an alternative to other conditions described herein, the one or more conditions can include a condition that specifies to generate a batch request when the number of data elements stored in the buffer meets a predetermined maximum number of data elements. The predetermined maximum number can be, for example, a function of the amount of data the HSM can process at one time. In an example described herein with reference to FIG. 1, the HSM 105 may be able to process x kilobytes of data at a time. Therefore, the predetermined maximum number of data elements can be the number of data elements that collectively represent x kilobytes of data. If the maximum number of data elements is met by a buffer, the server computing device can generate a batch request with a batch data structure that includes the contents of the buffer at the time the condition is met.

As another example in addition or as an alternative to other conditions described herein, the one or more conditions can include a condition that specifies to generate a batch request when the number of concurrent requests sent by a requesting computing device falls below a predetermined threshold rate. The server computing device 115 can be configured to measure the rate at which a requesting computing device, such as the user computing device 110, sends individual requests to the server computing device 115. The rate can be measured, for example, as requests-per-second. The predetermined threshold rate can be determined as a function of the average RPS of all requesting computing devices. If the current rate for the user computing device 110 falls below the average, then that can be an indication that requests are slowing down and that the server computing device 115 should batch and send current buffered requests rather than wait for more requests to arrive. If the current rate of requests from the user computing device 110 falls below the predetermined threshold rate, then the server computing device 115 can generate a batch request with a batch data structure that includes the contents of the buffer at the time the condition is met.

The device receiving the output batch data structure can forward the output batch data structure to the requesting computing device that generated the individual requests that were sent to the HSM. The device receiving the output batch data structure may be a device that received requests from other requesting computing devices and forwarded the requests to the HSM. If the device coupled to the HSM received the individual requests from another requesting device, then the device coupled to the HSM can transmit the output batch data structure to the requesting devices. In some implementations, the server computing device unbatches the individual outputs from the output batch data structure before sending the outputs to a requesting computing device.

The subject matter described in this specification can be implemented so as to realize one or more of the following advantages or technical effects. A hardware security module (HSM) can process batches of operations according to an API defining cryptographic operations and data structures implemented by the HSM. The HSM can perform with reduced computational overhead by batching requests for performing the same cryptographic operations, or by batching requests that share information, such as identifiers for the same cryptographic key stored on the HSM.

Batching data for HSM consumption can significantly improve throughput of the HSM, particularly when the batched data elements are small plaintexts and/or ciphertexts. Each operation performed by the HSM may have a fixed computational cost to perform an operation. Therefore, an HSM implemented in accordance with aspects of this disclosure can effectively process more data per operation, which can result in many requests being processed as batches versus receiving and processing each request individually. An HSM can go from handling thousands of requests per second to higher orders of requests per second by applying techniques in accordance with aspects of this disclosure.

By batching requests of this nature, the HSM can reduce fixed computational overhead attributed to network communication, at least by reducing the amount of data sent to the HSM at once. For example, overhead can be reduced at least because a single key identifier can be sent for multiple requests, as opposed to a separate copy of a key identifier for multiple requests streamed into the HSM.

The HSM can be configured to perform batch operations on a received batch using both a general-purpose processor and a cryptoprocessor. In doing so, the HSM can reserve specialized operations for processing on dedicated cryptoprocessors specially configured for processing cryptographic operations, while reserving operations such as input validation to be performed by a general-purpose processor of the HSM. The general-purpose processor and the cryptoprocessor can be configured for batch operation, including unpacking batched data for processing by the cryptoprocessor. From the perspective of a computing device coupled to the HSM, however, the HSM can receive and transmit input and output in batches, which can simplify the interaction between the HSM and the computing device overall.

The HSM can be configured to process batched requests in accordance with the operational capacity of the HSM. In other words, besides processing more requests, the HSM can be managed to avoid overloading the HSM as a result of receiving too many requests during a bursty period of network traffic. A computing device coupled to the HSM can receive and proxy batch requests according to one or more conditions, which can mitigate or prevent overloading a crucial component of the security of a network implementing the HSM.

Aspects of this disclosure can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

A computer program can be written in any type of programming language, and according to any programming paradigm, e.g., declarative, procedural, assembly, object-oriented, data-oriented, functional, or imperative. A computer program can be written to perform one or more different functions and to operate within a computing environment, e.g., on a physical device, virtual machine, or across multiple devices. A computer program can also implement functionality described in this specification as performed by a system, engine, module, or model.

In this specification the phrase "configured to" is used in different contexts related to computer systems, hardware, or part of a computer program. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program is said to be configured to perform one or more operations, this means that the computer program includes one or more program instructions, that when executed by one or more computers, causes the one or more computers to perform the one or more operations.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A hardware security module (HSM), comprising a plurality of processors configured to:
   receive a request to perform one or more cryptographic operations, wherein the request comprises a first batch data structure storing a plurality of data elements; and
   process the first batch data structure in accordance with the received request and the one or more cryptographic operations, wherein to process the first batch data structure the plurality of processors are configured to:
     unbatch the plurality of data elements,
     perform the one or more cryptographic operations on the plurality of data elements to generate a plurality of outputs, and
     generate an output batch data structure storing the plurality of outputs,
   wherein the request and the batch data structure are formed in accordance with a respective definition by a batch HSM application program interface (API), and
   wherein the batch HSM API defines one or more APIs, each API defining a respective cryptographic scheme, comprising defining one or more respective data structures and one or more respective cryptographic operations for performing the respective cryptographic scheme.

2. The hardware security module of claim 1, wherein the respective cryptographic operations comprise operations for encryption, decryption, key generation, signature generation, signature verification, random number generation, or message authentication.

3. A system comprising:
   a computing device comprising a plurality of processors and coupled to a hardware security module, wherein the plurality of processors are configured to:
     receive a plurality of requests to perform one or more cryptographic operations in one or more respective data elements of each request,
     batch the one or more respective data elements of each request into a first batch data structure,
     send, to the hardware security module, the first batch data structure as part of a batch request to perform the one or more cryptographic operations on first data elements of the first batch data structure, and
     receive, in response to the batch request, an output batch data structure comprising output data elements generated as output by the hardware security module performing the one or more cryptographic operations on the data elements of the first batch data structure,
   wherein each of the plurality of requests corresponds to a first key identifier,
   wherein the batch request further comprises the first key identifier, and
   wherein the computing device is a first computing device, and wherein the plurality of processors are further configured to:
     receive requests from one or more requesting computing devices coupled to the computing device, wherein each request of the received requests from the one or more requesting computing devices is a request to perform one or more respective cryptographic operations and comprises a respective key identifier;
     store data elements for similar received requests in a first buffer of one or more buffers in memory coupled to the computing device, wherein two requests are similar if each of the two requests comprises the same key identifier or are obtained from a same source device;
     determine whether the first buffer meets one or more conditions for sending data elements of similar received requests stored in the first buffer to the hardware security module; and
     in response to the determination that the first buffer meets the one or more conditions, batch each data element in the first buffer and send a batch data structure comprising each data element in the first buffer as part of a second request to the hardware security module.

4. The system of claim 3, wherein the plurality of processors are further configured to:
   for each unique key identifier received as part of the requests received from the one or more requesting computing devices, assign the unique key identifier to a respective buffer, and
   store data elements corresponding to a received request comprising a first key identifier in a buffer assigned the first key identifier.

5. The system of claim 3, wherein the one or more conditions for sending data elements in the first buffer comprise meeting a predetermined maximum age for a data element stored in the first buffer, wherein the age for a data element is measured from the time the data element is stored in the first buffer to the current time.

6. The system of claim 3, wherein the one or more conditions for sending data elements in the first buffer comprise meeting a predetermined maximum number of data elements stored in the first buffer.

7. A system comprising:
   a computing device comprising a plurality of processors and coupled to a hardware security module, wherein the plurality of processors are configured to:
     receive a plurality of requests to perform one or more cryptographic operations in one or more respective data elements of each request,
     batch the one or more respective data elements of each request into a first batch data structure,
     send, to the hardware security module, the first batch data structure as part of a batch request to perform the one or more cryptographic operations on first data elements of the first batch data structure, and receive, in response to the batch request, an output batch data structure comprising output data elements generated as output by the hardware security module performing the one or more cryptographic operations on the data elements of the first batch data structure, wherein the requests from the one or more requesting computing devices and the first batch data structure are formed in accordance with a batch HSM application program interface (API).

8. The system of claim 7, wherein the one or more cryptographic operations are defined in accordance with the batch HSM API.

9. The system of claim 7, wherein the batch HSM API defines one or more APIs, each API defining a respective cryptographic scheme, comprising defining one or more respective data structures and one or more respective cryptographic operations for performing the respective cryptographic scheme.

* * * * *